United States Patent [19]

Parker

[11] 4,388,210

[45] Jun. 14, 1983

[54] HIGH SURFACE AREA LEAD OXIDE COMPOSITE AND METHOD FOR MAKING THE SAME

[75] Inventor: G. Anthony Parker, Cheswick, Pa.

[73] Assignee: St. Joe Minerals Corporation, New York, N.Y.

[21] Appl. No.: 309,803

[22] Filed: Oct. 8, 1981

Related U.S. Application Data

[63] Continuation of Ser. No. 95,155, Nov. 19, 1979, abandoned, which is a continuation of Ser. No. 920,689, Jun. 30, 1978, abandoned.

[51] Int. Cl.³ .................... C01G 21/02; H01M 4/56
[52] U.S. Cl. .................... 252/182.1; 252/512; 423/619; 429/228
[58] Field of Search .......... 252/182.1, 512; 423/92, 423/93; 429/619, 228

[56] References Cited

U.S. PATENT DOCUMENTS

| | | | |
|---|---|---|---|
| 1,059,195 | 4/1913 | Muhlbauer | 423/619 |
| 1,506,633 | 8/1924 | Grunbaum | 423/619 |
| 1,910,280 | 5/1933 | Chamberlain | 423/619 |
| 1,991,314 | 2/1935 | Chamberlain | 252/182.1 |
| 2,182,479 | 12/1939 | Johnstone | 252/182.1 |
| 2,448,353 | 8/1948 | Chubb | 252/182.1 |
| 2,679,451 | 5/1954 | Staba | 423/619 |
| 3,121,030 | 2/1964 | Puls | 429/228 |
| 3,194,685 | 7/1965 | Malloy | 252/182.1 |
| 3,436,267 | 4/1971 | Faber | 423/581 |
| 3,644,090 | 2/1972 | Beechem | 423/619 |
| 3,959,453 | 5/1976 | Torikai et al. | 423/619 |

FOREIGN PATENT DOCUMENTS

| | | |
|---|---|---|
| 474267 | 5/1937 | United Kingdom . |
| 502194 | 8/1938 | United Kingdom . |

OTHER PUBLICATIONS

Chudnov, "Prop. of Lead Oxides ... in Solution", Russ. Jou. of Inorganic Chem.; 22(1), 1977.

*Primary Examiner*—Irwin Gluck

[57] ABSTRACT

A high surface area lead oxide composite is prepared by providing a mixture of starting matter containing lead oxide and a hydrogen bonding solvent and by then subjecting the mixture to a gaseous stream inclusive of ozone. The resulting reaction product is a solid composite of lead oxide and lead dioxide, found to exhibit greatly increased surface area and electrical conductivity over the starting material for efficient use of the solid composite as active material in electrochemical cells.

34 Claims, 1 Drawing Figure

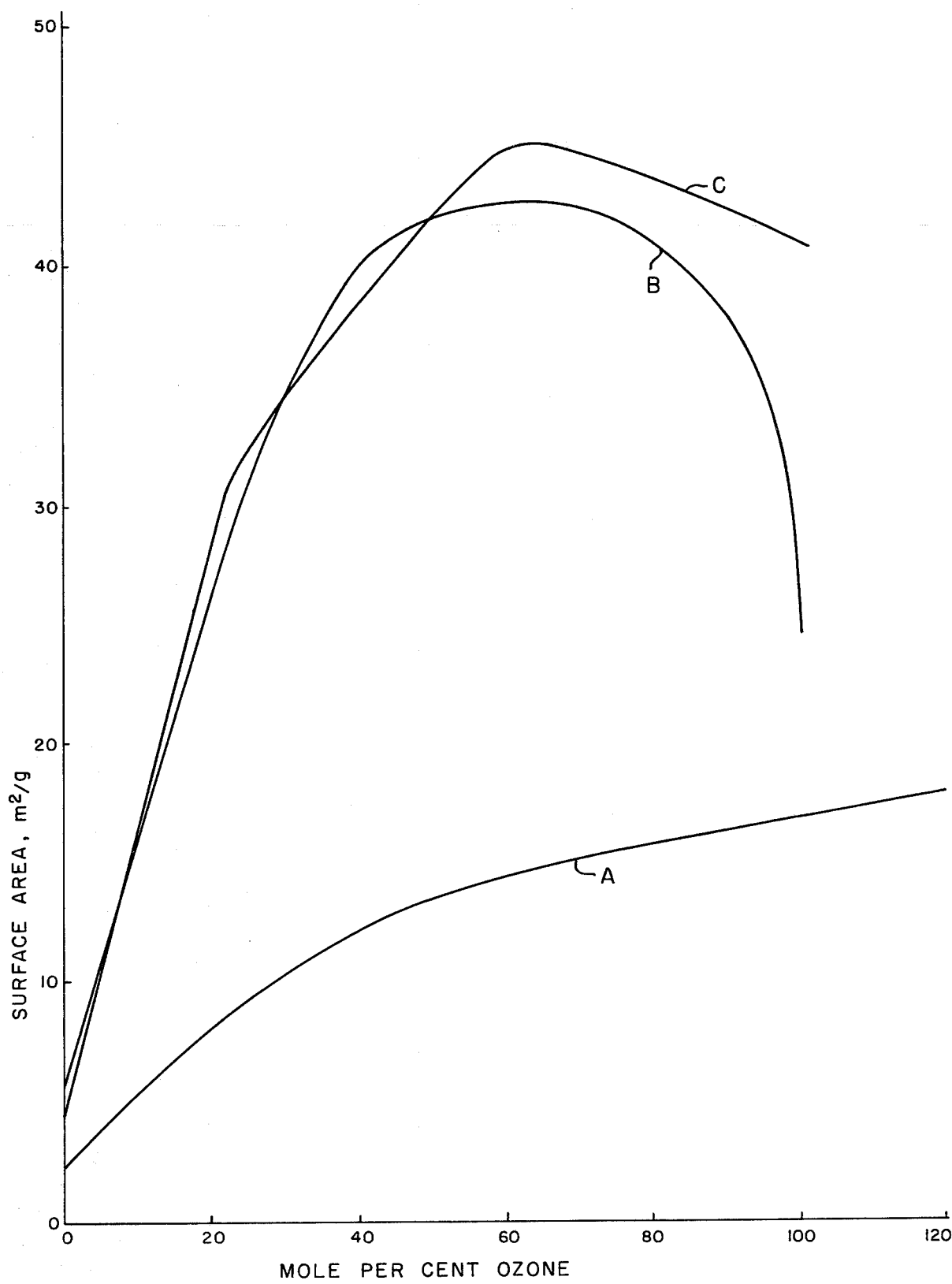

HIGH SURFACE AREA LEAD OXIDE COMPOSITE AND METHOD FOR MAKING THE SAME

This is a continuation of application Ser. No. 095,155, filed Nov. 19, 1979, now abandoned, which is a continuation of application Ser. No. 05/920,689, filed June 30, 1978, now abandoned.

FIELD OF THE INVENTION

This invention relates to methods for treating lead oxides and pertains more particularly to the preparation of improved lead oxide for such applications as battery active material.

BACKGROUND OF THE INVENTION

In lead-acid storage batteries, the art is constantly in search of lead paste or other forms of lead oxide active material which exhibit increased electrochemical usage in the course of battery discharge. Typically, for lead paste comprised of leady litharge in its commercial form, active material utilization in an electrochemical cell only reaches the level of approximately twenty-five percent of the theoretical active material capacity of the electrode. The art has long recognized the relationship between enhanced surface area of the particulate lead oxide of the lead paste and improvements in active material utilization. Thus, the greater the surface area of the particulate lead oxide, the greater is the exposure of active material to electrolyte.

The lead processing art has looked to such techniques as fuming and comminution of lead oxide in providing increased surface area of lead oxide, the latter as disclosed in British Pat. No. 474,267 (1937).

Various prior art efforts have involved chemical treatment of lead oxide to produce lead dioxide. Such efforts, not related to surface area considerations are discussed in detail in the prior art statement filed herein pursuant to 37 C.F.R. 1.97 and 1.98. They have encompassed treatment of insoluble lead salt in the presence of alkali with halogen or hypohalite and the treatment of lead oxide in aqueous alkali solution under pressure of air or oxygen. In the above-noted British patent, disclosure is made of a method for providing oxides and sub-oxides of lead by subjecting a finely divided dry solid to ozone. The practice is affected particularly by forced circulation of ozone through an airborne suspension of dry material, or by bleaching treatment of the dry solid by application of ultra violet light thereto. Comminution is completed prior to ozonation in this practice, whereby the material is in its finely divided form prior to oxidation by ozonation. In applicant's view, such prior art efforts providing lead dioxide by chemical oxidation of lead oxides would be of benefit in facilitating so-called electrochemical formation of electrodes having lead oxide active material, by reason of lead dioxide enhancement of electrical conductivity of such active material. Thus, prior chemical oxidation practice would enhance customary practice wherein lead oxide active material is rendered electrically conductive by conversion to lead dioxide in the course of initial electrolysis thereof, i.e., in initial battery charging. Nonetheless, no practice is presently known which would suggest achievement of both such enhancement of electrical conductivity and increase of lead oxide surface area jointly by chemical agency.

SUMMARY OF THE INVENTION

It is an object of the present invention to provide an improved method for treatment of lead oxide for the formation of a composite oxide having greatly increased surface area and enhanced electrical conductivity.

It is a more particular object of the invention to provide lead oxide having characteristics particularly suited to usage thereof as active material in electrochemical cells.

In attaining the foregoing and other objects, the invention provides a method wherein starting material containing lead oxide is mixed with aqueous liquid or other hydrogen bonding solvent, and the mixture is then subjected to a gaseous stream inclusive of ozone. A reaction product is produced by such method which comprises a solid composite having lead oxide of greatly increased surface area in accordance with the extent of ozonation and includes lead dioxide in measure providing for enhanced electrical conductivity. The mixture preferably contains promoters adapted to enhance surface area change, as is discussed more fully below. Electrochemical cells employing electrodes which include such reaction product as their active material, exhibit improved active material utilization over control comparison electrodes comprised of untreated starting material.

Attainment of increased surface area and electrical conductivity is unexpectedly reached in a common chemical reaction in accordance with the invention.

The foregoing and other objects and features of the invention will be further evidenced from the following detailed description of preferred practices in accordance with the invention and from the drawing which illustrates surface area attainable under the invention in various ozonation concentrations.

DESCRIPTION OF PREFERRED PRACTICES

By way of initial illustrative practice herein, in this Example 1, a twenty gram measure of commercially-available fume litharge (lead oxide, yellow PbO) is mixed with seven hundred milliliters of water. The mixture is stirred and a gaseous stream comprised of oxygen with ozone concentration of from one to two percent is admitted to the mixture at a delivery pressure of 0.56 Kg/cm$^2$ and an ozone delivery rate of 1.6 millimoles per minute. The following reactions are presumed to occur in the course of such ozonation:

$$PbO(o) + O_3 + H_2O \rightarrow [PbO-O_3]H_2O \qquad (1);$$

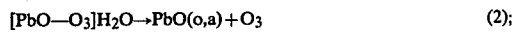

$$[PbO-O_3]H_2O \rightarrow PbO(o,a) + O_3 \qquad (2);$$

and

$$[PbO-O_3]H_2O \rightarrow PbO_2 + O_2 \qquad (3).$$

In reaction (1), there results a lead oxide-ozone complex of limited but sufficient solubility in water for decomposition. Such complex can decompose in two modes. In one mode, reaction (2), precipitation forms lead oxide, either orthorhombic (o) or amorphous (a), as a high surface area product. In the second mode, reaction (3), the complex decomposes to lead dioxide. Reaction (2) is more rapid than reaction (3), whereby surface area increases rapidly compared with lead dioxide formation.

Upon removing the solid composite, a light brown reaction product, from the mixture by vacuum filtration, it is water-washed and dried at 100° C. In contrast to the PbO starting material, having specific surface 2.1 m²/g, the reaction product has specific surface of 22.8 m²/g, an increase in surface area of about eleven-fold. The electrical conductivity of $PbO_2$-containing solid composite is $10^{-9}$ ohm$^{-1}$ cm$^{-1}$.

The oxidation of lead-containing starting materials by the ozonation of lead or lead sub-oxide ($Pb_2O$) is the expected result, and is known from the above-noted British patent. The concomitant observed great increase in surface area is, however, an unexpected result of ozonation. The process of the British patent is dry, involving ozone treatment of an airborne suspension of the comminuted starting material. An observation of applicant is that the surface area increase is directly related to the presence of a hydrogen bonding solvent, typically water, for ozone. In this observation, applicant finds that above-discussed ozonation practice involving fume litharge, conducted in the absence of water (or other hydrogen bonding solvent), yields a reaction product comprised of PbO and $PbO_2$ wherein the PbO exhibits specific surface of 2.1 m²/g, which is measurably the same as the specific surface (2.1 m²/g) of the starting PbO material.

By way of further general observations concerning ozonation of PbO in the presence of a hydrogen bonding solvent, surface area increase is found to be a function of mole percent ozone, defomed as the ratio of the number of moles of ozone to the number of moles of PbO starting material. Thus, an increase in surface area is observed with higher ozone concentration, as shown in fume litharge curve A in the drawing. On the other hand, the electrical conductivity of the solid composite does not increase uniformly with mole percent ozone but follows a step increase of several orders of magnitude at about sixty mole percent ozone. Preferred reaction temperature is 25° C. to 30° C., but the range of from 0° C. to 70° C. is applicable for aqueous mixtures. Above 70° C., ozone solubility in water is sufficiently low that reaction rate is diminished to a non-practical level.

Suitable starting materials for use in the practices herein include materials containing lead monoxide. Such materials may also include lead and/or lead dioxide. Commercial fume litharge, calcined litharge and leady litharge are typical materials. Further examples of pure aqueous practice follow.

EXAMPLE 2

100 grams commercial leady litharge of specific surface 0.8 m²/g is added to 3.5 liters of water. The mixture is stirred and an ozone-oxygen gas stream having an ozone concentration of 1-2 percent at a delivery pressure of 0.56 kg/cm² is admitted. The ozone is delivered at a rate of 1.6 millimoles/minute. After 2.5 hours, the product is recovered by vacuum filtration, water-washing and drying at 100° C. The light brown solid has specific surface of 22.7 m²/g and conductivity is $1.6 \times 10^{-8}$ ohm$^{-1}$ cm$^{-1}$. When used as positive active material in a lead-acid cell, the product has active material utilization of thirty-three percent versus twenty-six percent for untreated leady litharge.

EXAMPLE 3

52 grams commercial calcined litharge of specific surface 0.6 m²/g is added to 1.8 liters water. The mixture is stirred and an ozone-oxygen gas stream admitted as described in Example 2. After 1.5 hours, the product is recovered by vacuum filtration, water-washing and drying at 100° C. The brown solid has specific surface 40.0 m²/g and conductivity of $10^{-9}$ ohm$^{-1}$ cm$^{-1}$.

In aqueous solutions, various additives (promoters) are found to increase reaction rate and the maximum attainable product surface area. To facilitate an appreciation of the effectiveness of such promoters, it is helpful to consider the specific surface (2.1 m²/g) of fume litharge not treated by practices herein, and the specific surface of fume litharge treated by ozonation (Example 1 above) in pure water, i.e., 22.8 m²/g. Given this approximately eleven-fold increase obtained in simple aqueous mixture, the data below in Table I (aqueous alkaline salt promoters), Table II (aqueous acid salt promoters), Table III (aqueous neutral salt promoters) and Table IV (organic solvents) indicates effectiveness in comparison with such eleven-fold increase. In all examples set forth in the tables, as in the case of Example 1 (pure water; pH 6.5; 22.8 m²/g), twenty grams of fume litharge is added to seven hundred milliliters of solvent. Delivery pressure and delivery rate of ozone are as in Example 1. Ozone is used at fifty-two mole percent.

TABLE I

| Promoter | Concentration, moles/liter | pH | Specific Surface (m²/g) |
|---|---|---|---|
| Sodium carbonate | 0.013 | 10.7 | 60.9 |
| Sodium carbonate | 0.027 | 10.9 | 42.9 |
| Sodium carbonate | 0.007 | 10.2 | 28.4 |
| Disodium phosphate | 0.013 | 9.1 | 41.7 |
| Potassium carbonate | 0.013 | 10.7 | 41.3 |

TABLE II

| Promoter | Concentration, moles/liter | pH | Specific Surface (m²/g) |
|---|---|---|---|
| Ammonium fluoride | 0.013 | 5.1 | 61.5 |
| Ammonium fluoride | 0.02 | 5.1 | 57.4 |
| Ammonium fluoride | 0.005 | 4.8 | 51.1 |
| Ammonium chloride | 0.013 | 5.8 | 19.5 |
| Sulfuric Acid | 0.002 | 2.5 | 17.6 |

TABLE III

| Promoter | Concentration, moles/liter | pH | Specific Surface (m²/g) |
|---|---|---|---|
| Potassium fluoride dihydrate | 0.007 | 6.1 | 30.3 |
| Potassium fluoride dihydrate | 0.013 | 6.1 | 29.3 |
| Potassium fluoride dihydrate | 0.033 | 5.9 | 22.7 |
| Sodium chloride | 0.013 | 6.1 | 23.4 |
| Sodium sulfate | 0.013 | 6.5 | 21.0 |

TABLE IV

| Solvent | Specific Surface (m²/g) |
|---|---|
| Ethyl alcohol - 9% | 17.1 |
| Methy alcohol | 5.3 |
| Ethyl alcohol | 4.8 |

As is seen from these examples, surface area increase is provided over the pure aqueous case by a variety of promoters rendering the aqueous liquid of pH values extending throughout the pH range. Aqueous liquid is shown to be preferred for overall effectiveness, particularly by the improved yield in the ethyl alcohol-water case as against the pure ethyl alcohol case (Table IV). On the other hand, where benefit is sought for application not warranting aqueous treatment or liquid, for example, in preparing lead oxide for organic electrolyte lithium-lead oxide cells; both pure organic solvents yield improved specific surface as against the untreated fume litharge (2.1 m$^2$/g). The following examples are further illustrative of practices in accordance with the invention involving use of promoters.

EXAMPLE 4

100 grams commercial leady litharge of specific surface 0.8 m$^2$/g is added to 3.5 liters 0.03 molar sodium carbonate solution. The mixture is treated with oxone-oxygen as described in Example 1. The brown product is recovered by settling, decantation, vacuum filtration, water-washing and drying at 100° C. The product has specific surface 38.5 m$^2$/g and conductivity $1.5 \times 10^{-6}$ ohm$^{-1}$ cm$^{-1}$. In use as positive active material in a lead-acid cell, the product has initial active material utilization of thirty-six and one-half percent versus twenty-six percent for untreated leady litharge.

EXAMPLE 5

100 grams commercial orthorhombic fume litharge of specific surface 2.1 m$^2$/g is added to 3.5 liters of 0.03 molar sodium carbonate solution. The mixture is stirred and an ozone-oxygen gas stream as described in Example 1 is admitted. After 7 hours, the yellow-brown product is recovered by settling, decanting, vacuum filtration, water-washing and drying at 100° C. The product has specific surface of 44.4 m$^2$/g and conductivity 0.009 ohm$^{-1}$ cm$^{-1}$. In use as positive active material in a lead-acid cell, the product has active material utilization of forty-three percent versus thirty-six and one-half percent for untreated fume litharge.

In Examples 4 and 5 and in the carbonate examples in Table I, the carbonate promoter improves flocculation of the mixture, thereby facilitating separation by settling and decantation.

Curves B and C of the drawing show surface area of two fume litharge specimens both ozonated in aqueous sodium carbonate medium, i.e., water having 0.03 molar sodium carbonate promoter. Surface area in excess of 40 m$^2$/g is achieved where ozone is admitted in concentration of about 0.6 millimole per millimole of lead oxide starting material (sixty mole percent ozone). As is evident from a comparison of either of curves B or C with curve A, which illustrates surface area of fume litharge ozonated in pure aqueous mixture, surface area increase, of given measure is achievable in the presence of the promoter at lesser ozonation, viewed alternatively, in lesser time, than is achievable in the pure aqueous case. To attain surface area of eighteen square meters per gram of the composite lead oxide, one may operate at six mole percent ozone with the promoter or may operate at one hundred and twenty mole percent ozone without the promoter. Improved production efficiency thus attends use of the promoter with lessened ozonation, i.e., the reaction proceeds at a faster rate, higher surface area is provided, and the solid composite is made available at an earlier time.

Curves B and C are further indicative of practice in accordance with the invention wherein one determines the ozone concentration with promoter which yields the maximum attainable surface area increase. In the example illustrated in the drawing, ozone concentration beyond the sixty mole percent level provides diminishing return as respects surface area maximization.

In pure aqueous practice of the invention, particular benefit is had over prior art solution treatments above discussed in respect of contaminant production. Thus, ozone goes to oxygen, a gas not requiring disposal techniques. In contrast, alkali solution treatment in the prior art necessitates techniques for precipitation of the alkali and separation thereof. In the practice of the invention involving promoters, promoter concentration is quite low as contrasted with stoichiometric quantity of alkali salt in the referenced prior art practice. Accordingly, contaminant production and product disposal efforts are substantially lessened as against the liquid prior art practice in promoter practice hereof.

As is known to those skilled in the lead art, lead oxide may be provided in orthorhombic or tetragonal crystalline structure. Fume and calcined litharge are prepared at high temperatures and exhibit generally orthorhombic crystallinity, fume being essentially totally orthorhombic and calcined litharge being about ninety percent orthorhombic. Leady litharge can exhibit one or the other or both of the crystallinity extremes, based on the method of preparation thereof. In the course of experimentation, applicant has determined that the practice above discussed, i.e., ozonation in the presence of a hydrogen bonding constituent which permits ozone solvation and limited solvation of the lead oxide-ozone complex, is applicable to starting material having lead oxide content of any crystallinity or any combination of crystalline structures. By the term "promoter", applicant defines substance or substances providing surface area in the composite reaction product on ozonation which is in excess of surface area attainable in said composite on the same ozonation thereof absent said substance.

Various changes and modifications to the foregoing disclosed practices will be evident to those skilled in the art and may be introduced without departing from the invention. In this connection, the percent concentration of ozone in the gaseous medium may be increased or decreased from that above disclosed, with concomitant respective decrease or increase in the time extent of ozonation, to attain the same results. Accordingly, it is to be understood that the particularly discussed methods, species combinations of liquid medium and promoter, starting materials and separation, washing and drying techniques are intended in an illustrative and not in a limiting sense. The true scope of the invention is set forth in the appended claims.

I claim:

1. In a method for preparation of a high surface area lead oxide composite, the steps of:
   (a) preselecting starting material comprised of a lead oxide or lead sub-oxide;
   (b) admixing said starting material and a liquid medium containing a hydrogen bonding solvent; and
   (c) subjecting such mixture to a gaseous flow constituted inclusive of ozone to precipitate from said mixture a composite of lead oxide and lead dioxide having an increased surface area relative to said starting material.

2. The method claimed in claim 1 including the further steps of separating such precipitate composite from said mixture and drying same.

3. The method claimed in claim 2 including the further step, practiced between such separation and drying steps, of washing said composite.

4. The method claimed in claim 1 wherein said liquid medium is an aqueous medium.

5. The method claimed in claim 4 wherein said liquid medium further comprises a substance providing surface area in said composite on such ozonation which is in excess of surface area attainable in said composite on the same ozonation thereof absent said substance.

6. The method claimed in claim 5 wherein said substance is selected from the group consisting of acidic, neutral and basic salts and mixtures thereof.

7. The method claimed in claim 1 wherein said liquid medium comprises an organic substance.

8. The method claimed in claim 7 wherein said liquid medium comprises said organic substance and water.

9. The method claimed in claim 7 wherein said liquid medium consists of organic substance.

10. The method claimed in claim 6 wherein said substance is selected from the basic salt group consisting of sodium carbonate, disodium phosphate and potassium carbonate and mixtures thereof.

11. The method claimed in claim 6 wherein said substance is selected from the acidic salt group consisting of ammonium fluoride and ammonium chloride and mixtures thereof.

12. The method claimed in claim 6 wherein said substance is selected from the neutral salt group consisting of potassium fluoride dihydrate, sodium chloride and sodium sulfate and mixtures thereof.

13. The method claimed in claim 1 wherein said step (a) is practiced by preselection of starting material selected from the group consisting of leady litharge, fume litharge and calcined litharge and mixtures thereof.

14. In a method for the preparation of a high surface area lead oxide composite, the steps of:
(a) preselecting starting material comprised of lead oxide or lead sub-oxide;
(b) admixing said starting material and an aqueous medium containing a carbonate salt; and
(c) subjecting such mixture to a gaseous flow constituted inclusive of ozone to precipitate from said mixture a composite of lead oxide and lead dioxide.

15. The method claimed in claim 14 wherein said carbonate salt is selected from the group consisting of sodium carbonate and potassium carbonate and mixtures thereof.

16. In a method for the preparation of a high surface area lead oxide composite, the steps of:
(a) preselecting a starting material comprised of lead oxide or lead sub-oxide;
(b) admixing said starting material and a liquid medium of pH less than 6.5 containing a hydrogen bonding solvent; and
(c) subjecting such mixture to a gaseous flow constituted inclusive of ozone to precipitate from said mixture a composite of lead oxide and lead dioxide.

17. In a method for the preparation of a high surface area lead oxide composite, the steps of:
(a) preselecting a starting material comprised of lead or lead sub-oxide;
(b) admixing said starting material and a liquid medium of pH greater than 9 containing a hydrogen bonding solvent; and
(c) subjecting such mixture to a gaseous flow constituted inclusive of ozone to precipitate from said mixture a composite of lead oxide and lead dioxide.

18. A composite of lead oxide and lead dioxide produced by the steps of:
(a) preselecting a starting material comprised of lead oxide or lead sub-oxide;
(b) admixing said starting material and a liquid medium containing a hydrogen bonding solvent; and
(c) subjecting such mixture to a gaseous flow constituted inclusive of ozone to precipitate from said mixture said composite of lead oxide and lead dioxide having an increased surface are relative to said starting material.

19. The composite produced in accordance with claim 18 which further includes the step of separating such precipitate composite from said mixture and drying same.

20. The composite produced in accordance with claim 19 which further includes the step of washing the composite between said separation and drying steps.

21. The composite produced in accordance with claim 18 wherein said liquid medium is an aqueous medium.

22. The composite produced in accordance with claim 21 wherein said liquid medium further comprises a substance providing surface area in said composite on such ozonation which is in excess of surface area attainable in said composite on the same ozonation thereof absent said substance.

23. The composite produced in accordance with claim 22 wherein said substance is selected from the group consisting of acidic, neutral and basic salts and mixtures thereof.

24. The composite produced in accordance with claim 18 wherein said liquid medium comprises an organic substance.

25. The composite produced in accordance with claim 24 wherein said liquid medium comprises said organic substance and water.

26. The composite produced in accordance with claim 24 wherein said liquid medium consists of an organic substance.

27. The composite produced in accordance with claim 23 wherein said substance is selected from the basic salt group consisting of sodium carbonate, disodium phosphate and potassium carbonate and mixtures thereof.

28. The composite produced in accordance with claim 23 wherein said substance is selected from the acidic salt group consisting of ammonium fluoride and ammonium chloride and mixtures thereof.

29. The composite produced in accordance with claim 23 wherein said substance is selected from the neutral salt group consisting of potassium fluoride dihydrate, sodium chloride and sodium sulfate and mixtures thereof.

30. The composite produced in accordance with claim 18 wherein step (a) is practiced by preselection of a starting material selected from the group consisting of leady litharge, fume litharge and calcined litharge and mixtures thereof.

31. A composite of lead oxide and lead dioxide produced by the steps of:
(a) preselecting a starting material comprised of lead oxide and lead sub-oxide;
(b) admixing said starting material and an aqueous medium containing a carbonate salt; and
(c) subjecting such mixture to a gaseous flow constituted inclusive of ozone to precipitate from said mixture a composite of lead oxide and lead dioxide having an increased surface area relative to said starting material.

32. The composite produced in accordance with claim 31 wherein said carbonate salt is selected from the group consisting of sodium carbonate and potassium carbonate and mixtures thereof.

33. A high surface area composite of lead oxide and lead dioxide produced by the steps of:
(a) preselecting a starting material comprised of lead oxide or lead sub-oxide;
(b) admixing said starting material and a liquid medium of pH less than 6.5 containing a hydrogen bonding solvent; and
(c) subjecting such mixture to a gaseous flow constituted inclusive of ozone to precipitate from said mixture a composite of lead oxide and lead dioxide.

34. A high surface area composite of lead oxide and lead dioxide produced by the steps of:
(a) preselecting a starting material comprised of lead oxide or lead sub-oxide;
(b) admixing said starting material and a liquid medium of pH greater than 9 containing a hydrogen bonding solvent; and
(c) subjecting such mixture to a gaseous flow constituted inclusive of ozone to precipitate from said mixture a composite of lead oxide or lead dioxide.

* * * * *